Patented Sept. 7, 1926.

1,598,699

UNITED STATES PATENT OFFICE.

ERNEST BATEMAN AND ERNEST EVERETT HUBERT, OF MADISON, WISCONSIN, DEDICATED, BY MESNE ASSIGNMENTS, TO THE CITIZENS OF THE UNITED STATES OF AMERICA.

COMPOSITION FOR THE PREVENTION OF SAP STAINING AND MOLDING.

No Drawing. Application filed May 23, 1924. Serial No. 715,456.

(GRANTED UNDER THE ACT OF MARCH 3, 1883; 22 STAT. L. 625.)

This application is made under the act of March 3, 1883, chapter 143 (22 Stat. 625) and the invention herein described and claimed may be used by the Government of the United States without the payment to us of any royalty thereon. We hereby dedicate the same to the free use of the Government and the people of the United States.

Our invention relates to a composition for the prevention of sap staining and molding caused by the action of fungi or bacteria on lumber by means of chemicals which are poisonous to the organisms and which, when the necessity for their use is removed, evaporate spontaneously from the wood, leaving a surface which is not poisonous to humans and against which articles intended for human consumption can be laid without fear of affecting either the digestibility, odor or palatability of the foodstuffs.

In the art of prevention of sap staining and molding of lumber the processes followed so far with more or less success are of two distinct types depending upon the composition of the preservative used. (1) Sap staining and molding can be partially prevented by the use of an alkaline solution, which makes the surface of the wood more or less uninhabitable to the sap stain fungi or bacteria, or molds. This process is not, however, an unqualified success. (2) Sap staining or molding can be partially prevented by the use of a material poisonous to fungi, bacteria and molds. Such compositions as solutions of sodium fluoride or mercuric chloride have attained a certain degree of sucsess so far as sap staining and molding are concerned. However, there is left on the surface of the board a small amount of the material which is poisonous not only to fungi, bacteria and molds but to human beings as well. Boards treated with these materials to prevent sap staining and molding cannot, therefore, be used in the manufacture of containers for articles of food intended for human consumption, such as butter tubs, cheese boxes, fruit baskets and slack cooperage products.

Our invention relates to the use of chemicals which at the time of using are poisonous to fungi, bacteria and molds, but which by the action of the air are changed into a volatile poisonous material which evaporates and a harmless and odorless salt remains. In carrying out our invention we make use of the well known fact that salts of the alkalies or alkali earths with phenols or naphthols are decomposed by acids to form free phenols or naphthols which are volatile, and salts of the particular acid used. Carbonic acid, which is always present in the air, is strong enough to accomplish this decomposition.

We have discovered that when boards or other wooden products are dipped or sprayed with a weak alkaline solution of a phenol the rate of decomposition of the phenolate is such that the poisonous property is retained on the surface of the board or wooden product for a time sufficiently long that sap staining or molding is prevented. Yet when the boards are dry enough for their intended use they do not retain enough of the poisonous materials to impart even the slightest odor to the wood. In carrying out our invention we prefer to dip or spray the boards or wooden products with the following solution: A solution composed of 1 lb. of cresol and 7 oz. of caustic soda dissolved in 100 gals. of water. This solution is merely a typical example of a successful solution and is not to be taken as the whole invention. The concentration of the solution may be varied to fit the particular needs, or either the alkaline base or the phenol radical may be varied to suit the requirements or the cost at the particular time of its use. Neither the method of applying nor the concentration of the solution, nor the actual combinations of the chemicals are important provided that the material used shall be one of the several soluble salts produced by the combination of an alkali or alkaline earths with a phenol or crude oils from which phenols are obtained.

Having thus described our invention, we claim:—

A process for preventing sap staining and molding in or on wood and wooden products, consisting of impregnating said products with a water solution of an alkaline phenolate which will react with the air forming an alkaline carbonate and a free volatile phenol which is dissipated by the air upon evaporation of the water.

ERNEST BATEMAN.
ERNEST EVERETT HUBERT